Figure 1:
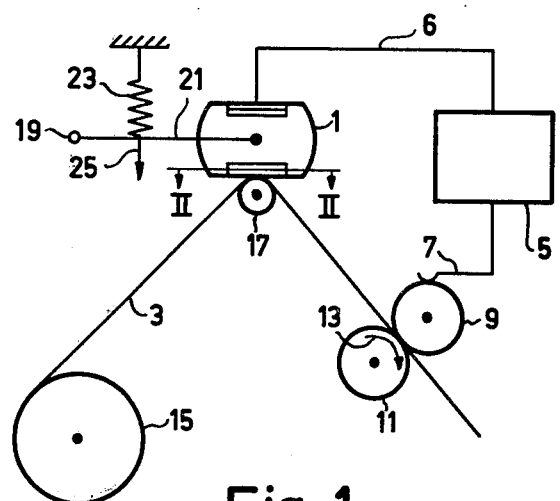

United States Patent [19]

Potma et al.

[11] 4,162,503
[45] Jul. 24, 1979

[54] PRINTING HEAD WITH TAUT WIRE ELECTRODES

[75] Inventors: Theodorus H. Potma, Eindhoven; Gerhardus T. H. Tomassen, Someren, both of Netherlands

[73] Assignee: U.S. Philips Corporation, New York, N.Y.

[21] Appl. No.: 860,703

[22] Filed: Dec. 15, 1977

[30] Foreign Application Priority Data

Feb. 18, 1977 [NL] Netherlands .................... 7701721

[51] Int. Cl.² ...................... G03G 17/00; G01D 15/06
[52] U.S. Cl. .................................. 346/163; 346/139 C
[58] Field of Search ................. 346/163, 139 C, 161, 346/162, 164

[56] References Cited

U.S. PATENT DOCUMENTS

| 2,876,060 | 3/1959 | Chambers | 346/163 |
| 3,693,185 | 9/1972 | Lloyd | 346/155 |
| 3,965,479 | 6/1976 | Sakamoto | 346/139 C |
| 3,978,494 | 8/1976 | Noker | 346/139 C |

FOREIGN PATENT DOCUMENTS

| 1190206 | 3/1963 | Fed. Rep. of Germany | 346/139 C |
| 46-13794 | 3/1965 | Japan | 346/139 C |
| 433343 | 6/1975 | U.S.S.R. | 346/139 C |

OTHER PUBLICATIONS

IBM Tech. Discl. Bull., vol. 15, No. 3, 8/72 "P.C. Wiring Head for Electro Chemical Printer", p. 775, Barrington.

*Primary Examiner*—Jay P. Lucas
*Attorney, Agent, or Firm*—David R. Treacy

[57] ABSTRACT

A recording device for recording on electro-sensitive paper, comprising a recording head with a row of recording electrodes which consist of taut wires which freely extend through the air between grooves in a unitary support. The paper is passed between the recording electrodes and a straight backing member which is arranged opposite the centers thereof.

8 Claims, 8 Drawing Figures

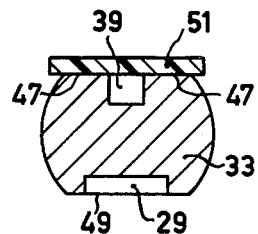
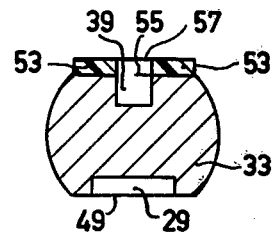
Fig. 5          Fig. 6
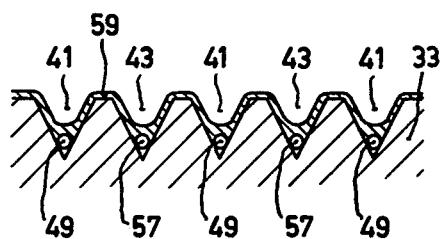
Fig. 7
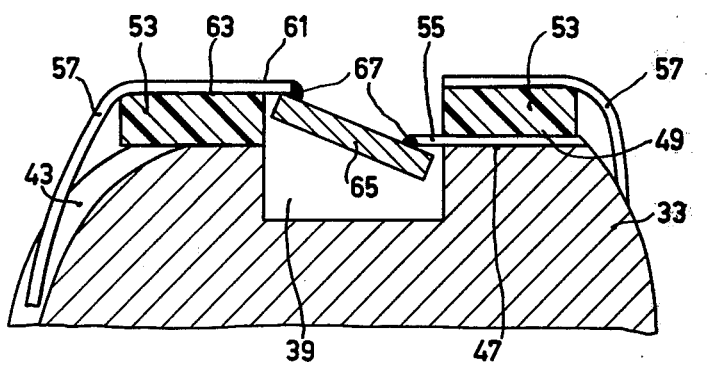
Fig. 8

PRINTING HEAD WITH TAUT WIRE ELECTRODES

The invention relates to a recording device for recording information on a strip-like record carrier, comprising a recording head with a number of recording electrodes which are arranged in a row, and a transport device for displacing the record carrier along a transport path which extends perpendicularly to the row of recording electrodes.

The record carrier may consist of a strip of electrosensitive paper, which is covered with a metal layer which is contacted by the recording electrodes. When a voltage is applied between a recording electrode and a counter-electrode, having a large surface area and also being in contact with the record carrier, the metal layer at the area of the recording electrode evaporates, so that the underlying paper of a different color becomes visible. Thus, alphanumeric characters as well as curves consisting of points and representing variable quantities can be recorded on the record carrier by selective actuation of the recording electrodes. A device of this kind is known from U.S. Pat. No. 3,419,886. The recording electrodes of the known device consists of wires which are bent at right angles and which are clamped on one end, the other end contacting the record carrier. Recording electrodes of this kind have the flexibility in the direction perpendicular to the plane of the record carrier which is necessary for a suitably resilient contact with the record carrier. However, they also have a given degree of freedom of movement in the transport direction of the record carrier and perpendicularly to these two directions. This is a drawback when well-defined recording is required which, when viewed at the reading distance, must create the impression of being formed by continuous lines. A second drawback of the known device consists in that the ends of the wires which form the recording electrodes scrape across the record carrier, thus producing dust which may contaminate the devices.

The invention has for its object to provide a recording device of the kind set forth which does not have these drawbacks. To this end, the device in accordance with the invention is characterized in that each of the recording electrodes is formed by a taut wire which extends freely in the air, parallel to the transport path which extends over a backing member that is so shaped and arranged that, in operation, the record carrier contacts each recording electrode solely in the central region of the latter, the contact region being situated in a straight line.

A preferred embodiment of the recording device in accordance with the invention, which offers the additional advantage that it can be simply and cheaply manufactured, is characterized in that the wires which form the recording electrodes are mounted on a support which consists of a cylindrical rod in which two slots which extend in the longitudinal direction are recessed, the first slot being bridged by the recording electrodes, one end of each wire projecting into or above the second slot in order to form a connection, the arrangement being such that of every two adjoining wires the connection of one wire is situated on the one side of the second slot, and the connection of the other wire is situated on the other side of this slot.

The invention will be described in detail hereinafter with reference to the accompanying diagrammatic drawing.

Figure 2:
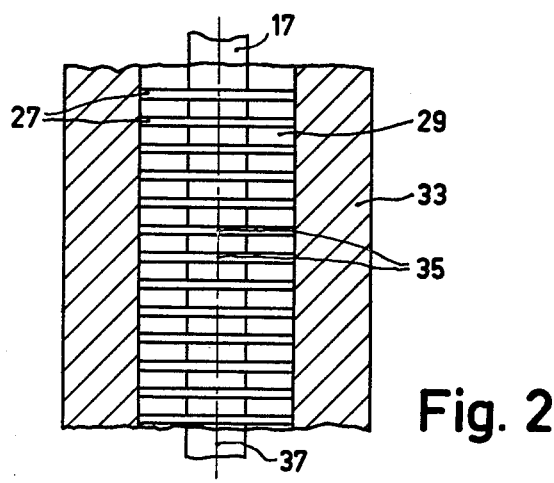

FIG. 1 is a diagrammatic side elevation of a recording device in accordance with the invention, FIG. 2 is a sectional view at an enlarged scale taken along the line II—II in FIG. 1, and FIGS. 3 to 8 illustrate a number of phases of the manufacture of a recording head for the device shown in FIG. 1.

The recording device which is diagrammatically shown in FIG. 1 comprises a recording head 1 for recording information on a strip-like record carrier 3 which consists of an electrosensitive paper, for example, paper provided with a layer of vapor-deposited aluminum. The recording head 1 comprises, as will be described in detail hereinafter, a number of wire-like recording electrodes which are arranged in a row and which are in contact with the sensitive surface of the record carrier 3. A generator 5 is connected, via a connection cable 6, to the recording head 1 and, via a wiper contact 7 to a roller-shaped counter-electrode 9 which also contacts the record carrier 3, so that the current circuit is closed. When one of the recording electrodes is actuated by the generator 5, the current density at the area of the point of contact between the relevant recording electrode and the record carrier is so high that the aluminum layer locally evaporates and the background of different color becomes visible. The record carrier 3 is transported in its longitudinal direction, perpendicularly to the row of recording electrodes, by a transport roller 11 which cooperates with the counter-electrode and which is driven in the direction of the arrow 13 by a motor (not shown). The transport path along which the record carrier 3 is displaced extends from a supply roller 15, over a straight backing member 17, to the transport roller 11. The recording head 1, connected to an arm 21 which is pivotable about a pivot 19, is pressed against the backing member 17 by a spring 23 which exerts a force in the direction of the arrow 25. The backing member 17 is formed by a shaft which has a radius of approximately 2 mm and which may be stationary or which may rotate (possibly, it may also be driven). If desired, the backing member may also consist of a plate or a bar.

FIG. 2 shows the arrangement of the backing member 17 and the recording electrodes 27 at an increased scale. The electrodes consist of taut wires which bridge a slot 29 in a support 33. The backing member 17 is arranged approximately opposite the centers of the electrodes 27, The points 35 where the record carrier 1 contacts the electrodes 27 are thus situated in a straight line 37 which connects the centers of the recording electrodes to each other.

The FIGS. 3 to 8 show a number of steps of the manufacturing process of the recording head 1. The details of the construction are thus also revealed.

Figure 3:
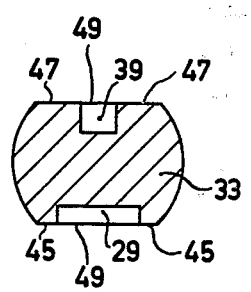
Figure 4:
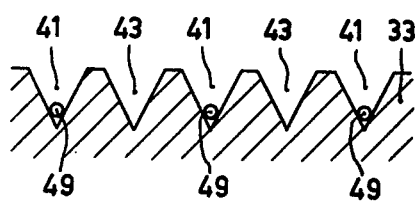

The support 33 consists of a cylindrical rod which is shown in a cross-sectional view in FIG. 3. In this rod two slots which extend in the longitudinal direction are recessed: the first slot 29, over which the recording electrodes 27 will be tensioned at a later stage, and a second slot 39 which is arranged diametrically opposite thereto. On the surface of the support 33 there are also provided two helical grooves 41 and 43 arranged generally in a double-thread screw pattern (see FIG. 4 which is a partial longitudinal sectional view). Furthermore, adjacent the edges of each of the slots 29 and 39 there are provided two faces 45 and 47, respectively, which are parallel to the bottoms of the respective slots. The support 33 is preferably made of aluminum which is provided, after the milling of the slots 29 and 39 with the faces 45 and 47 and the cutting of the grooves 41 and 43, with an insulating layer by opal anodizing. This is a method of anodic oxidation which is the subject of Netherlands Patent Application 6609803 laid open to public inspection, to which British Pat. No. 1,127,098 corresponds.

On the support 33 a first wire 49 is wound in the first groove 41, said wire bridging the two slots 29 and 39 a number of times to form a first set of alternate electrodes of the recording head. This wire is preferably made of tungsten.

Subsequently, on the faces 47 a plate of epoxy 51 is glued to cover the slot 39 (see FIG. 5). This plate initially has a thickness of approximately 1.6 mm and is ground down to 0.3 mm after gluing, and is subsequently ground through, so that a strip 53 remains on both sides of the slot 39, and the slot has become 0.3 mm deeper (see FIG. 6). Moreover, the wire 49 is ground through, so that on one side of the slot 39 (the left side in FIG. 6) the wire ends coincide with the plane of the wall of the slot, while on the other side the wire ends project approximately 0.5 mm into the slot in order to form connections 55.

Subsequently, a second tungsten wire 57 is wound in the second groove 43, to form the remaining electrodes said wire being arranged over the strips 53 (see also FIG. 7). The surface of the support 33 is then covered with a layer of glue 59 in order to anchor the wires 49 and 57 in the grooves 41 and 43. The wire 57 is subsequently also ground through, so that the wire ends coincide on the right-hand side with the plane of the wall of the slot 39 and project 0.5 mm on the left-hand side in order to form connections 61 (see FIG. 8). FIG. 8 clearly shows that the wire ends which form the connections 55 on the right-hand side of the slot 39 extend over the face 47 originally provided on the support 33, while the wire ends which form the left connections 61 extend over the upper face 63 of the left-hand strip 53 which is at a higher level.

Finally, in the slot 39 there is provided a substrate 65 with surface wiring whereto the connections 55 and 61 are connected, for example, by connections 67 of solder or conductive glue. As a result of the difference in height between the connections 61 and 55, the substrate 65 encloses a small angle with the plane of the connections, but this has no effect whatsoever in practice. This angle is shown substantially larger in FIG. 8 than it actually is (the width of the slot 39 amounts to approximately 7 mm in practice and the difference in height between the connections amounts to 0.3 mm). The connection cable 6 can be connected to the substrate 65.

The described construction offers the advantage that the distance between two adjacent connections is always two times larger than the distance between two adjacent recording electrodes. As a result of the difference in height of the left and the right connections 61 and 55, there is no risk of damaging of the already extending connections 55 when the wire 57 is ground through.

If desired, the length of the support 33 may be chosen so that a number of recording heads can be manufactured therefrom. The support is then cut into pieces of the desired length before the substrate 65 is provided.

A support of opaque aluminum offers the advantage that the dimensional accuracy is very high. However, other materials, for example, synthetic materials or a metal covered with a synthetic material can also be used.

What is claimed is:

1. A recording device having a backing member, and a recording head having a support and a plurality of recording electrodes mounted in the support and arranged in a row, for marking an electro-sensitive record carrier moving along a path between the backing member and the electrodes perpendicular to the row, wherein
    the plurality of electrodes is formed by a plurality of taut wires disposed parallel to each other, each wire being supported in grooves at two locations in a unitary support equally spaced from a central contact region, the wire extending freely between the grooves, said contact regions being arranged in a straight line and the backing member being arranged opposite said line.

2. A device as claimed in claim 1 wherein said support is a cylindrical rod having first and second longitudinal slots, the electrodes bridging the first slot such that the contact regions are in a line along the middle of the slot; and each wire has first and second respective ends terminating at first and second opposite sides of said second slot, alternate wires having first ends projecting into the second slot at the first side, the other wires having their second ends projecting into the second slot at the second side.

3. A device as claimed in claim 2 wherein the support has first and second faces extending longitudinally adjacent the first and second sides of the second slot, said second face having a distance above the bottom of the second slot greater than the distance of the first face above the bottom of the second slot, said first and second ends being disposed along said first and second faces respectively.

4. A device as claimed in claim 1 wherein said support is a cylindrical rod, and said grooves are formed in a generally helical pattern.

5. A device as claimed in claim 4 wherein said rod has first and second longitudinal slots, the electrodes bridging the first slot such that the contact regions are in line along the middle of the slot; and each wire has first and second respective ends terminating at first and second opposite sides of said second slot, said generally helical pattern being a double-thread helical groove arrangement formed on the rod, alternate wires being wound in a same thread groove.

6. A device as claimed in claim 5, further including a printed wiring substrate extending along said second slot, inclined at an angle corresponding to the height difference between the first and second faces, alternate wires having their first ends connected to said substrate at locations adjacent said first face, the other wires having their second ends connected to said substrate adjacent the second face.

7. A method of manufacturing a recording head for marking an electro-sensitive record carrier, comprising
    forming at least one generally helical groove in a cylindrical support rod,
    forming two longitudinal slots in the support rod,
    then winding electrode wire in said grooves such that the electrode wire bridges said slots, and then removing portions of said wire along a second of said slots and forming connection points for said electrode wires.

8. A method as claimed in claim 7, wherein said step of forming a groove includes forming a generally helical double-thread groove pattern, a first electrode wire is wound in a first thread groove of said double-thread pattern prior to said removing step, thus forming alternate electrode wires; and after said removing step a second electrode wire is wound in the other grooves, and a portion of said second wire is then removed along said second slot.

* * * * *